United States Patent
Invie et al.

(10) Patent No.: US 12,038,592 B2
(45) Date of Patent: Jul. 16, 2024

(54) STRAY LIGHT ABSORBING FILM

(71) Applicant: 3M INNOVATIVE PROPERTIES COMPANY, St. Paul, MN (US)

(72) Inventors: Judith M. Invie, Woodbury, MN (US); Steven Hin-Chung Kong, Woodbury, MN (US); John A. Wheatley, Stillwater, MN (US); Moses M. David, Wells, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1045 days.

(21) Appl. No.: 16/959,748

(22) PCT Filed: Jan. 3, 2019

(86) PCT No.: PCT/IB2019/050056
§ 371 (c)(1),
(2) Date: Jul. 2, 2020

(87) PCT Pub. No.: WO2019/135192
PCT Pub. Date: Jul. 11, 2019

(65) Prior Publication Data
US 2020/0379147 A1 Dec. 3, 2020

Related U.S. Application Data

(60) Provisional application No. 62/614,205, filed on Jan. 5, 2018.

(51) Int. Cl.
*G02B 5/22* (2006.01)
*G02B 5/00* (2006.01)

(52) U.S. Cl.
CPC .................. *G02B 5/003* (2013.01)

(58) Field of Classification Search
CPC ...... G02B 5/003; G02B 5/22; G02B 27/0018; G01J 3/0262
See application file for complete search history.

(56) References Cited

U.S. PATENT DOCUMENTS 5,175,030 A 12/1992 Lu
5,243,464 A * 9/1993 Lauf ........................ G02B 5/22
359/888

(Continued)

FOREIGN PATENT DOCUMENTS

CN 105353434 2/2016
JP 2010175653 A 8/2010

(Continued)

OTHER PUBLICATIONS

Advanta™ Black, Nano Lab, [retrieved from the internet on Sep. 1, 2020], URL <http://www.nano-lab.com/advanta.html>, 6 pages.

(Continued)

*Primary Examiner* — Balram T Parbadia
(74) *Attorney, Agent, or Firm* — Clifton F. Richardson (57) ABSTRACT

Stray light absorbing films are described. In particular, stray light films including a black substrate, and first and second sets of microstructures are described. The described films can reduce stray light reflections in sensor modules and other optical devices. The first set of microstructures can have an average largest diameter between 0.5 and 125 μm. The second set of microstructures can have an average largest diameter of less than ½ of the average largest diameter of the first set of microstructures. The stray light absorbing film can have a specular reflectance for 8° incidence for wavelengths from 350-1200 nm of less than 0.3%.

31 Claims, 7 Drawing Sheets

(56) References Cited

U.S. PATENT DOCUMENTS

| | | | |
|---|---|---|---|
| 5,888,594 A | 3/1999 | David | |
| 8,634,146 B2 | 1/2014 | David | |
| 2006/0033991 A1* | 2/2006 | Toda | G03B 21/56 |
| | | | 359/452 |
| 2009/0069662 A1 | 3/2009 | Rongen | |
| 2010/0165276 A1 | 7/2010 | David | |
| 2010/0165468 A1* | 7/2010 | Yamada | G02B 5/003 |
| | | | 359/613 |
| 2010/0302479 A1 | 12/2010 | Aronson | |
| 2011/0008580 A1* | 1/2011 | Kagawa | H01Q 17/00 |
| | | | 428/167 |
| 2011/0031008 A1* | 2/2011 | Kagawa | B32B 27/365 |
| | | | 428/116 |
| 2011/0051251 A1* | 3/2011 | Endoh | G02B 1/118 |
| | | | 430/321 |
| 2011/0069393 A1 | 3/2011 | Hamamura | |
| 2014/0016202 A1* | 1/2014 | Toshima | G02B 5/021 |
| | | | 359/599 |
| 2014/0016203 A1* | 1/2014 | Toshima | G02B 5/0226 |
| | | | 524/590 |
| 2014/0154469 A1* | 6/2014 | Kagawa | H01Q 17/002 |
| | | | 428/155 |
| 2015/0027771 A1* | 1/2015 | Kagawa | H01Q 17/00 |
| | | | 174/350 |
| 2015/0031004 A1 | 1/2015 | Kennerly | |
| 2016/0037034 A1* | 2/2016 | Inasaki | C07F 9/304 |
| | | | 546/10 |
| 2016/0202401 A1* | 7/2016 | Christiansen | G02B 5/26 |
| | | | 362/257 |
| 2017/0045658 A1* | 2/2017 | Kumai | G02B 5/003 |
| 2017/0067150 A1 | 3/2017 | David | |
| 2017/0146701 A1* | 5/2017 | Nagahama | G03B 9/08 |
| 2019/0086790 A1* | 3/2019 | Aotake | C09K 11/06 |
| 2019/0394911 A1* | 12/2019 | Kagawa | H05K 9/0088 |
| 2020/0004039 A1* | 1/2020 | Ogasahara | H04N 23/00 |
| 2020/0012911 A1* | 1/2020 | McCoy | G02B 5/12 |
| 2020/0270475 A1* | 8/2020 | Jensen | C09D 7/20 |

FOREIGN PATENT DOCUMENTS

| | | |
|---|---|---|
| WO | WO 2010-078306 | 7/2010 |
| WO | WO 2010-123528 | 10/2010 |
| WO | WO 2011-109284 | 9/2011 |
| WO | WO 2012-125247 | 9/2012 |
| WO | WO 2012-125324 | 9/2012 |
| WO | WO 2013-025614 | 2/2013 |
| WO | WO 2013-148031 | 10/2013 |
| WO | WO 2013-148129 | 10/2013 |
| WO | WO 2015-028036 | 3/2015 |
| WO | 2015122975 A | 8/2015 |
| WO | WO 2017-033027 | 3/2017 |
| WO | 2017154649 A | 9/2017 |
| WO | 20171546491 A | 9/2017 |

OTHER PUBLICATIONS

"Diffuse Black Coatings & Materials Archives," Avian Technologies, [retrieved from the internet on Sep. 30, 2020], URL < https://aviantechnologies.com/product/avian-ds-black/>, 10 pages.
Black Coating Services, Acktar Advance Coatings, [retrieved from the internet on Sep. 1, 2020], URL <http://www.acktar.com/category/BlackOpticalCoating>, 9 pages.
Singularity™ Black, Optical Black Paints, Surface Treatments & Coatings, Nano Lab, [retrieved from the internet on Sep. 1, 2020], URL <http://www.nano-lab.com/optical-black-coatings.html>, 3 pages.
International Search Report for PCT International Application No. PCT/IB2019/050056, mailed on Jun. 25, 2019, 7 pages.

* cited by examiner

STRAY LIGHT ABSORBING FILM

CROSS REFERENCE TO RELATED APPLICATIONS

This application is a national stage filing under 35 U.S.C. 371 of PCT/IB2019/050056, filed Jan. 3, 2019, which claims the benefit of U.S. Provisional Application No. 62/614,205, filed Jan. 5, 2018, the disclosure of which is incorporated by reference in its/their entirety herein.

BACKGROUND

Stray or unwanted light may provide errant data to sensor packages or may degrade the signal to noise ratio for the data measured. Films may be used to absorb light in an optical cavity.

SUMMARY

In one aspect, the present disclosure relates to a stray light absorbing film. In particular, the stray light absorbing film includes a substrate, where the substrate is black, a first set of microstructures disposed on a major surface of the substrate, and a second set of microstructures disposed on the major surface of the substrate. The first set of microstructures are characterized by an average largest diameter between 0.5 and 125 μm. The second set of microstructures are characterized by an average largest diameter of less than ½ the average largest diameter of the first set of microstructures.

In another aspect, the present disclosure relates to a stray light absorbing film. In particular, the stray light absorbing film includes a substrate, where the substrate is black, a set of irregular, faceted microstructures disposed on a major surface of the substrate, and a set of nanostructures disposed on the set of irregular, faceted microstructures. The nanostructures are holes within the set of irregular, faceted microstructures. None of the nanostructures is larger than the average largest diameter of the set of irregular, faceted microstructures.

In yet another aspect, the present disclosure relates to a stray light absorbing film including a polymeric substrate with a structured surface, where a total reflectance at 8° incidence from 350-1200 nm is less than 5%.

In another aspect, the present disclosure relates to a stray light absorbing film including a polymeric substrate with a structured surface, where a specular reflectance at 8° incidence from 350-1200 nm is less than 1%.

In yet another aspect, the present disclosure relates to a stray light absorbing film including a polymeric substrate with a structured surface, where a CIE-Y photopic reflectance in an integrating sphere is less than 5%.

In another aspect, the present disclosure relates to a stray light absorbing film including a polymeric substrate with a structured surface. The stray light absorbing film has an 85 degree gloss of less than 5 gloss units.

In yet another aspect, the present disclosure relates to a stray light absorbing film including a polymeric substrate with a structured surface. The stray light absorbing film has a bright reflectance with a BDRF cutoff of 0.01 of less than 4%.

DETAILED DESCRIPTION

Sensors and sensor packages are typically designed to detect light within a limited angular or solid angle range. In order to maintain acceptably high signal to noise ratios, as little light as possible from outside the range of interest should reach the sensor. Unfortunately, and particularly in automotive or outdoor environments, glare, reflections, headlights, and other strong sources of potentially interfering light are abundant. Films described herein can help reduce noise from light trapped in sensor cavities or incident at high angles.

Films described herein have both a macro- and nanostructured surface profile. In some embodiments, the macrostructure may be formed from a microreplication process. In some embodiments, the macrostructured surface profile may include features having an average largest diameter between 0.5 μm and 125 μm. In some embodiments, the macrostructured surface profile may include features having an average largest diameter between 0.5 μm and 15 μm. In some embodiments, the macrostructured surface profile may include grooves or ridges. In some embodiments, the macrostructured surface profile may include a series of linear prisms. In some embodiments, the macrostructured surface includes random microstructures, pseudo-random microstructures, discrete microstructures, canted microstructures, or a combination of any of them. While the macrostructured surface is macroscopic vis-à-vis the nanostructured surface profile, it still may be formed from processes conventionally known as microreplication, and therefore may be also referred to as microstructures.

The macrostructures of the structured surface profile of the invention are unitary, that is, the macrostructures are formed into the microstructures for example, via a molding process, and no additional material is added to the surface to enable or enhance formation of macrostuctures. In some embodiments, the "randomness" of the distribution of the macrostructure is within a repeating pattern. This is due to the configuration of the mold used to provide such a macrostructured surface and its repeated use.

Suitable microreplication processes may be used to form the macrostructured surface profile, such as a continuous cast and cure process, or a batch process. A suitable microreplicatable resin, carried on a substrate, is contacted with a tool or mold containing inverses of the desired features. The resin is then hardened, crosslinked, or cured by, for example, exposure to ultraviolet light and removed, forming the macrostructured surface profile. In order to form one embodiment of the macrostructured surface, a microstructured roll is subjected to an electroplating process.

A base or substrate is provided that can serve as a foundation upon which metal layers can be electroplated.

The substrate can take one of numerous forms, e.g. a sheet, plate, or cylinder. Circular cylinders are advantageous in that they can be used to produce continuous roll goods. The substrate is typically made of a metal, and exemplary metals include nickel, copper, and brass. Other metals may however also be used. The substrate has an exposed surface ("base surface") on which electrodeposited layers will be formed in subsequent steps. The base surface may be smooth and flat, or substantially flat. The curved outer surface of a smooth polished cylinder may be considered to be substantially flat, particularly when considering a small local region in the vicinity of any given point on the surface of the cylinder.

A first layer of a metal is then formed on the base surface of the substrate using a first electroplating process. Before this step is initiated, the base surface of the substrate may be primed or otherwise treated to promote adhesion. The metal may be substantially the same as the metal of which the base surface is composed. For example, if the base surface comprises copper, the first electroplated layer formed may also be made of copper. To form the first layer of the metal, the first electroplating process uses a first electroplating solution. The composition of the first electroplating solution, e.g., the type of metal salt used in the solution, as well as other process parameters such as current density, plating time, and substrate speed, are selected so that the first electroplated layer is not formed smooth and flat, but instead has a first major surface that is structured, and characterized by irregular flat-faceted features. The size and density of the irregular features are determined by the current density, plating time, and substrate speed, while the type of metal salt used in the first electroplating solution determines the geometry of the features. Further teaching in this regard can be found in patent application publication US 2010/0302479 (Aronson et al.). The first plating process is carried out such that the first major surface of the first electroplated layer has a first average roughness that is greater than the base average roughness of the substrate.

The shapes and sizes of the macrostuctures vary depending upon the type of metal that is electroplated onto a roll mold. The shapes and sizes of the macrostuctures are the reverse of the shapes and sizes of the metal structures plated onto the roll. Such shapes include those that resemble pores, semi-hemispheres, "jagged" valleys, "craters", and the surface of cauliflower. Macrostuctures may overlap, be within one another, or be isolated from one another. The sizes, that is, largest diameter, of the macrostuctures can range from about 0.5 micrometers to about 125 micrometers at their largest diameter. A typical range is from 0.5 to 15 micrometers. Areas of the macrostuctures can range from about 0.01 to about 1100 square micrometers. Depths can range from about 0.2 to about 20 micrometers. The macrostructured surface may have a mean surface slope of between 10 and 20 degrees, between 20 and 30 degrees, between 35 and 55 degrees, or between 40 and 50 degrees.

The nanostructures of the nanostructured surface may be any shape and size. In some embodiments, the nanostructures may be holes formed in the surface. In some embodiments, these holes may have an average largest diameter of less than half of the average largest diameter of the macrostructures. In some embodiments, the average largest diameter of the nanostructures is less than $1/5$ or even less than $1/10$ the average largest diameter of the macrostructures. In some embodiments, the nanostructures have an average largest diameter of less than 100 nm, of less than 50 nm, of less than 20 nm, or even of less than 10 nm. In some embodiments, none of the nanostructures has a largest diameter greater than the average largest diameter of the macrostructures.

The nanostructured surface of films described herein may be formed from a reactive ion etching process over a discontinuously deposited masking layer. For example, in one embodiments, the nanostructured surface is formed by applying a thin, random, discontinuous masking layer to a major surface of the macrostructured film using plasma chemical vapor deposition. The random, discontinuous masking layer is the reaction product of plasma chemical vapor deposition using a reactant gas that includes a compound selected from organosilicon compounds, metal alkyls, metal isopropoxides, metal acetylacetonates and metal halides. Typically, the organosilicon compounds can include tetramethylsilane, trimethylsilane, hexamethyldisiloxane, tetraethylorthosilicate, or a polyhedral oligomeric silsesquioxane. Useful metal alkyls can comprise trimethylaluminum, tributylaluminum, tributyltin, or tetramethyl gallium. Useful metal isopropoxides can comprise titanium isopropoxide, or zirconium isopropoxide. Useful metal acetylacetonates can comprise platinum acetylacetonates, or copper acetylacetonate. Useful metal halides can comprise titanium tetrachloride, or silicon tetrachloride.

Plasma chemical vapor deposition (or plasma-enhanced chemical vapor deposition) is a process by which plasmas, typically generated by radio-frequency discharge, are formed in the space between two electrodes when that space is filled with a reacting gas or gases. Plasma chemical vapor deposition is done under vacuum to reduce side reactions from unwanted species being present in the reacting chamber. The reacting gas or gases typically deposit thin solid films on a substrate. A random, discontinuous masking layer is formed on the macrostructured film using plasma chemical vapor deposition. It has been found that certain chemical species, when plasma deposited on a substrate in very short time form random, discontinuous islands of material. For example, in Example 1 of U.S. Pat. No. 8,634,146 (David et al.), the reactive gas was tetramethylsilane and the substrate was poly(methyl methacrylate), the plasma chemical vapor deposition was performed at a web speed of from about 7 ft/min to about 9 ft/min (213 cm/min to 274 cm/min) at a pressure of about 10 mTorr and a plasma power of about 100-200 Watts to produce random, discontinuous islands of polymerized tetramethylsilane on the substrate.

Typically, when reactant gases derived from relatively small organic or organometallic compounds are plasma chemical vapor deposited on the provided substrates, they initially form small islands of reacted material. Although not wishing to be bound by theory, it is likely that this effect is similar to small amounts of liquids, such as water, initially beading up on a surface that has a different surface energy. In a similar manner, when small amounts of the product produced by plasma chemical vapor deposition initially deposit on the provided substrates they tend to huddle together in small islands that are initially in a random, discontinuous pattern. In the provided method, reaction conditions are adjusted (web speed, plasma discharge energy, time of substrate exposure, etc.) so as to halt the deposition before any coalescence occurs. The masking layer thus deposited is random and discontinuous. The individual islands typically have average dimensions of less than about 400 nm, less than about 200 nm, less than about 100 nm, less than about 50 nm or even less than about 20 nm.

The provided method includes etching portions of the major surface not protected by the masking layer to form nanostructures on the macrostructured film. In some embodiments, the etching and the deposition may be performed simultaneously, as in U.S. Pat. App. Pub. No.

2017/0067150 (David et al.). These nanostructures may appear as holes with a high aspect ratio. In some embodiments, these holes may have a dimension of greatest extent along a length direction, and the length direction may be within 10 degrees of normal of the plane of the film. In some embodiments, the length direction may not be within 10 degrees of the normal of the plane of the film.

Typically, reactive ion etching is used for the etching. In one embodiment, this can be carried out using a continuous roll-to-roll process referred to as "cylindrical reactive ion etching" (cylindrical RIE). Cylindrical RIE utilizes a rotating cylindrical electrode to provide anisotropically etched nanostructures on the surface of a substrate or article. In general, cylindrical RIE can be described as follows. A rotatable cylindrical electrode ("drum electrode") powered by radio-frequency (RF) and a grounded counter-electrode are provided inside a vacuum vessel. The counter-electrode can comprise the vacuum vessel itself. An etchant gas is fed into the vacuum vessel, and a plasma is ignited and sustained between the drum electrode and the grounded counter-electrode.

A continuous substrate comprising a random, discontinuous masking layer can then be wrapped around the circumference of the drum and the substrate can be etched in the direction normal to the plane of the substrate or at a canted angle to the normal of the plane of the substrate. The exposure time of the substrate can be controlled to obtain a predetermined etch depth of the resulting nanostructure. The process can be carried out at an operating pressure of approximately 10 mTorr. Cylindrical RIE is disclosed, for example, in PCT Pat. App. No. US/2009/069662 (David et al.).

Films described herein with both a macrostructured and nanostructured surface profile are formed using a substrate that absorbs light. In some embodiments, the light absorptive substrate may be or include a polymeric material (such as polyethylene terephthalate, polycarbonate, poly(methyl methacrylate), polycarbonate, or the like) with a broadband absorber, such as carbon black. In some embodiments, the absorber may be or include a wavelength-specific absorber; for example, an absorber, dye, or pigment that absorbs near-infrared light. In some embodiments, the substrate may include a downconverter, such as a phosphor material or quantum dots, that absorbs a certain wavelength of light and reemits the light at a longer wavelength; for example, absorbing light that may interfere with a sensor or sensor device and remitting it at a wavelength that is not detectable.

Nanostructured surfaces described herein have been used in antireflective surfaces. Antireflective surfaces increase the coupling of light into a substrate by minimizing the light lost to Fresnel reflections, increasing transmission. For the films described herein, which are not transparent, antireflection treatments would be unusual. Surprisingly, these antireflective surfaces, combined with the irregular faceted macrostructure significantly reduce both total, overall reflectance and specular reflectance. This reduction in both overall reflectance and specular reflectance is significantly beyond what can be achieved by simply applying an antireflective treatment to a flat, absorptive substrate. For example, in some embodiments, films described herein having both a macrostructured and nanostructured surface profile may have a total reflectance at 8° incidence over a range between 350-1200 nm of less than 5%, less than 4%, less than 3%, less than 2%, or even less than 1%. Films described herein having both a macrostructured and nanostructured surface profile may have a specular reflectance at 8° incidence in a range between 350-1200 nm of less than 2%, less than 1%, less than 0.5%, or even less than 0.3%. Films described herein having both a macrostructured and nanostructured surface profile may have a CIE-Y photopic reflectance in an integrating sphere of less than 5%, less than 4%, less than 3%, or even less than 2%. Films described herein having both a macrostructured and nanostructured surface profile may have an 85 degree gloss of less than 5 gloss units, less than 2 gloss units, or even less than 1 gloss unit. Films described herein having both a macrostructured and nanostructured surface profile may have a bright reflectance with a BDRF cutoff of 0.06 of less than 3%, less than 2%, less than 1%, or even less than 0.5%. Films described herein having both a macrostructured and nanostructured surface profile may have a bright reflectance with a BDRF cutoff of 0.03 of less than 3%, less than 2%, less than 1%, or even less than 0.5%. Films described herein having both a macrostructured and nanostructured surface profile may have a bright reflectance with a BDRF cutoff of 0.01 of less than 4%, less than 2%, or even less than 1%. Films described herein having both a macrostructured and nanostructured surface profile may have a bright reflectance with a BDRF cutoff of 0.005 of less than 4%, less than 2%, or even less than 1%.

Films described herein may be used in applications such as the interior cavity of a head up display (or another projection system), or the interior of a liquid crystal display (LCD), where they would prevent the loss of contrast in these systems from stray or errant light. In some embodiments, these films may be used in a sensor, such as a LiDAR sensor, for an automobile or for any other application. In some embodiments, films described herein may include an adhesive layer (formed as a tape) for attachment to the interior of an optical cavity. Films described herein may be curved, corrugated, embossed, or otherwise three dimensionally shaped. In some embodiments, these films may be shaped to conform to the inside shape of a cavity. Films described herein may be shaped through thermoforming, insert molding, or similar processes. For applications where films described herein are exposed to ambient conditions and radiation, such as sunlight, such films may be laminated or otherwise in thermal contact with a thermally conductive material or a heatsink.

EXAMPLES

Objects and advantages may be further illustrated by the following examples, but the particular materials and amounts thereof recited in these examples, as well as other conditions and details, should not be construed to unduly limit this disclosure.

Samples were prepared with materials provided in Table 1.

TABLE 1

| Designation | Description | Source |
| --- | --- | --- |
| Hostaphan BPV7D | Black PET film | Mitsubishi Polyester Film, Greer, SC, USA |
| Photomer 6010 | Urethane Monomer | IGM Resins, USA, Inc., Charlotte, NC, USA |
| SR351 | Trimethylol propane triacrylate (TMPTA) | Arkema, Blooming Prairie, MN, USA |
| SR339 | Phenoxy ethyl acrylate (PEA) | Arkema, Blooming Prairie, MN, USA |
| Miramer M1142 | o-phenylphenol ethyl acrylate (OPPEA) | Miwon Specialty Chemical Co., Ltd, Anyang City, South Korea |

TABLE 1-continued

| Designation | Description | Source |
|---|---|---|
| Irgacure 1700 | Photoinitiator | BASF USA, Florham Park, NJ |
| Irgacure 819 | Photoinitiator | BASF USA, Florham Park, NJ |
| 9B1173 | Black Pigment- 20% Carbon dispersion in Propoxylated Neopentyl Glycol diacrylate | Penn Color, Doylestown, PA, USA |

Comparative sample A is a 175 micrometer thick Hostaphan BPV7D film that has a width and length of approximately 20-25 centimeters and 25-30 centimeters, respectively. No microstructures or nanostructures were formed on either surface of comparative sample A.

Comparative sample B is a 175 micrometer thick Hostaphan BPV7D film that has a width and length of approximately 20-25 centimeters and 25-30 centimeters, respectively, with a nanostructured surface on one film side. The nanostructured surface was formed from a reactive ion etching process over a discontinuously deposited masking layer with process settings including a hexamethyldisiloxane flow rate of 10 cm$^3$/min, an oxygen flow rate of 750 cm$^3$/min, a radio frequency power of 7500 watts, and a web translation speed of 76.2 cm/min. Comparative sample B has a measured thickness of about 173 micrometers.

Sample C is a substrate film that has a width and length of approximately 20-25 centimeters and 25-30 centimeters, respectively, with nanostructures and microstructures formed on one surface. The microstructures were formed on the film substrate surface by microreplication using a tool formed from an electroplated microreplication tool with irregular flat-faceted features. The tool was used to make microstructures by means of a cast and cure process such as described in U.S. Pat. No. 5,1,175,030. The substrate film was a 175 micrometer thick Hostaphan BPV7D film and the resin used in the cast and cure process was a UV-curable acrylic resin loaded with black pigment. The UV-curable acrylic resin composition used in this sample is described in Table 2. The nanostructured surface was formed on the microstructure surface from a reactive ion etching process over a discontinuously deposited masking layer with process settings including a hexamethyldisiloxane flow rate of 10 cm$^3$/min, an oxygen flow rate of 750 cm$^3$/min, a radio frequency power of 7500 watts, and a web translation speed of 76.2 cm/min. Sample C has a measured thickness of 190-200 micrometers.

Sample D is a substrate film that has a width and length of approximately 20-25 centimeters and 25-30 centimeters, respectively, with microstructures formed two major surfaces of the substrate film and nanostructures formed on one major surface. The microstructures were formed on two major surfaces of a film substrate by microreplication of each surface using a tool formed from an electroplated microreplication tool with irregular flat-faceted features. The tool was used to make microstructures by means of a cast and cure process such as described in U.S. Pat. No. 5,1,175,030. The substrate film was a 175 micrometer thick Hostaphan BPV7D film and the resin used in the cast and cure process was a UV-curable acrylic resin loaded with black pigment. The UV-curable acrylic resin composition used in this sample is described in Table 2. The nanostructured surface was formed on the microstructure surface from a reactive ion etching process over a discontinuously deposited masking layer with process settings including a hexamethyldisiloxane flow rate of 10 cm$^3$/min, an oxygen flow rate of 750 cm$^3$/min, a radio frequency power of 7500 watts, and a web translation speed of 76.2 cm/min. Sample D has a measured thickness of 205-210 micrometers.

Sample E is a substrate film that has a width and length of approximately 20-25 centimeters and 25-30 centimeters, respectively, with microstructures formed two major surfaces of the substrate film and nanostructures formed on one major surface. The microstructures were formed on two major surfaces of a film substrate by microreplication of each surface using a tool formed from an electroplated microreplication tool with irregular flat-faceted features. The tool was used to make microstructures by means of a cast and cure process such as described in U.S. Pat. No. 5,1,175,030. The substrate film was a 175 micrometer thick Hostaphan BPV7D film and the resin used in the cast and cure process was a UV-curable acrylic resin loaded with black pigment. The UV-curable acrylic resin composition used in this sample is described in Table 2. Microreplication of microstructures on each major surface was conducted three times. The nanostructured surface was formed on the microstructure surface from a reactive ion etching process over a discontinuously deposited masking layer with process settings including a hexamethyldisiloxane flow rate of 10 cm$^3$/min, an oxygen flow rate of 750 cm$^3$/min, a radio frequency power of 7500 watts, and a web translation speed of 76.2 cm/min. Sample E has a measured thickness of 240-250 micrometers.

TABLE 2

| Tradename: | Weight % |
|---|---|
| Photomer 6010 | 52 |
| SR351 | 5 |
| SR339 | 7 |
| Miramer M1142 | 13 |
| Irgacure 1700 | 1 |
| Irgacure 819 | 7 |
| 9B117 | 15 |

Example 1—Scatterometry Test

Bi-directional reflectance distribution functions (BRDF) were measured for each sample with incidence angles of 0°, 15°, 30°, 45°, 60° and 75° with a Radiant Imaging IS-SA Imaging Sphere (Radiant Vision Systems, formerly Radiant Imaging, Redmond, WA, USA). BRDF is a known term in the art and generally relates to a ratio of scattered luminance over the incident illuminance for a given incident direction and a given scattered direction. The photopic BRDF corresponds to the CIE-Y BRDF measured with this instrument. This instrument gives CIE-Y values for illuminant E.

Bright reflectance provides a measure of the effective reflectance for applications where stray light with high amplitude peaks is undesirable. An ideal stray light sample is a surface that minimizes the impact of stray light for all geometries, a Lambertian surface with low total reflectance. In some cases, an ideal stray light sample is a black surface. Bright reflectance is the reflectance obtained by integrating the measured BRDF over the region that is above a BRDF cutoff value. The formula for bright reflectance is provide below:

Bright Reflectance =

$$100\frac{\int\int_A B(\theta_X, \theta_Y)\frac{\sin\left(\sqrt{\theta_X^2+\theta_Y^2}\right)\cos\left(\sqrt{\theta_X^2+\theta_Y^2}\right)}{\sqrt{\theta_X^2+\theta_Y^2}}d\theta_X d\theta_Y}{\int\int_A \frac{\sin\left(\sqrt{\theta_X^2+\theta_Y^2}\right)\cos\left(\sqrt{\theta_X^2+\theta_Y^2}\right)}{\sqrt{\theta_X^2+\theta_Y^2}}d\theta_X d\theta_Y}$$

$(\theta_X, \theta_Y)$ are the coordinates in scattered angle space defined as follows:

$\theta_X = \theta \cos \varphi$ $\theta_Y = \theta \sin \varphi$ $\theta^2 = \theta_X^2 + \theta_Y^2$ q is the angle between the scattered direction and the sample normal. $\varphi$ is the azimuthal angle relative to the x-axis (horizontal axis of the IS-SA).

A is the region in $(\theta_X, \theta_Y)$ space where $\theta \le 82°$ and excludes the blind spot of the IS-SA in the direction of the incident light. Note that the integration is taken over $\theta_X$ and $\theta_Y$ in radians.

$$B(\theta_X, \theta_Y) = \begin{cases} 0 & BRDF(\theta_X, \theta_Y) \le BRDF \text{ cutoff} \\ BRDF(\theta_X, \theta_Y) & BRDF(\theta_X, \theta_Y) > BRDF \text{ cutoff} \end{cases}$$

If the BRDF cutoff equals zero, then the measured bright reflectance should be approximately equal to the measured total reflectance. The BRDF cutoff was set to 0.005, 0.01, 0.03, and 0.06. A perfect Lambertian reflector with 100% total reflectance has a constant BRDF of 0.318. Therefore, these BRDF cutoff values are about 5 to 60 times lower, which represents reasonably low BRDFs. The mean bright reflectance was calculated as the bright reflectance averaged over the incidence angles used to measure the BRDF. The mean total reflectance, the mean specular reflectance, and mean bright reflectance were all calculated from the BRDF data and reported for all samples in Table 3. The mean in each case was taken over the incidence angles of 0°, 15°, 30°, 45°, 60° and 75°. The mean bright reflectance was reported for four BRDF cutoffs.

TABLE 3

| Samples | Mean Total Reflectance (%) | Mean Specular Reflectance (%) | Mean Bright Reflectance (%) | | | |
|---|---|---|---|---|---|---|
| | | | Cutoff 0.005 | Cutoff 0.01 | Cutoff 0.03 | Cutoff 0.06 |
| Comparative Sample A | 10.65 | 7.40 | 10.12 | 9.69 | 8.78 | 8.29 |
| Comparative Sample B | 5.46 | 2.39 | 4.78 | 4.18 | 3.54 | 3.25 |
| Sample C | 1.40 | 0.02 | 0.71 | 0.33 | 0.11 | 0.06 |
| Sample D | 1.64 | 0.02 | 0.97 | 0.64 | 0.16 | 0.08 |
| Sample E | 1.80 | 0.02 | 1.11 | 0.84 | 0.37 | 0.04 |

The results show that comparative sample A gives the highest mean total reflectance and mean bright reflectance which is undesirable when used in LiDAR sensor applications to aid in a reduction of stray light. The results further show that comparative sample B also gives high mean total reflectance and mean bright reflectance which shows a reduction in mean bright reflectance over comparative sample A but is still undesirable when used in LiDAR sensor applications. The results from samples C, D, and E show a reduction in mean bright reflectance over comparative sample A of no less than 9 times and as much as 200 times. The results from samples C, D, and E show a reduction in mean bright reflectance over comparative sample B of no less than 4 times and as much as 80 times.

For all samples analyzed, the BRDF in the direction of the incident light is excluded. Special optical configurations can be made to measure the BRDF in this direction but typical commercial scatterometers including the IS-SA Imaging Sphere do not have this capability. For the 0° case, this results in specular exclusion. Hole filling was not used to provide interpolated data in the direction of the incident light.

BRDF data were exported using 0.25 degree increments and integration diameter. The inherent resolution of the IS-SA Imaging Sphere with the settings used is about 1.5 degrees. The cross-section plots were generated with about 2 degree resolution. BRDF scatter maps and cross-section plots of the BRDF scatter maps were generated and show the scatter distribution of the reflected light.

Figure 1:
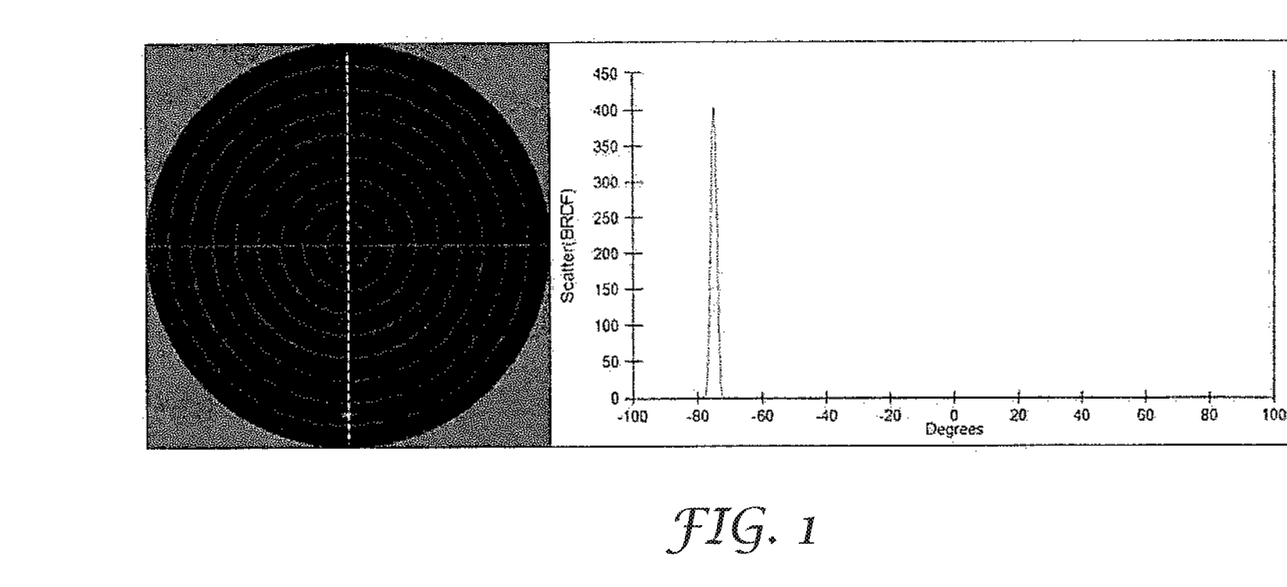
FIG. 1 shows the BRDF scatter map and cross-section plot for comparative sample A.

FIG. 1 shows BRDF scatter map and cross-section plot for comparative sample A, where the angle of incidence is 75°. Note that the BRDF of comparative sample A is low except about 75°, where the peak magnitude exceeds 400.

Figure 2:
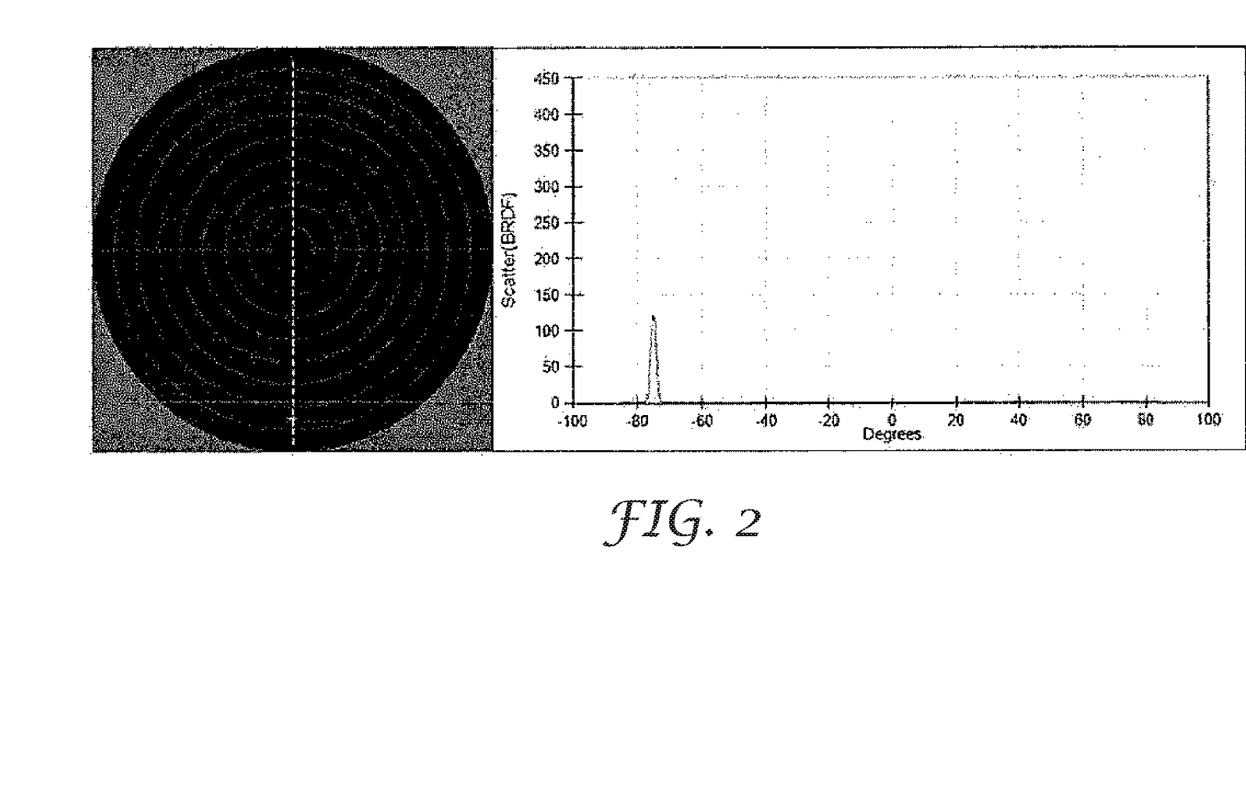
FIG. 2 shows the BRDF scatter map and cross-section plot for comparative sample B.

FIG. 2 shows BRDF scatter map and cross-section plot comparative sample B, where the angle of incidence is 75° on the side with the nanostructure surface. Note that the BRDF of comparative sample B is also low except about 75°, where the peak magnitude exceeds 100 which is just under a 4× reduction in scatter.

Figure 3:
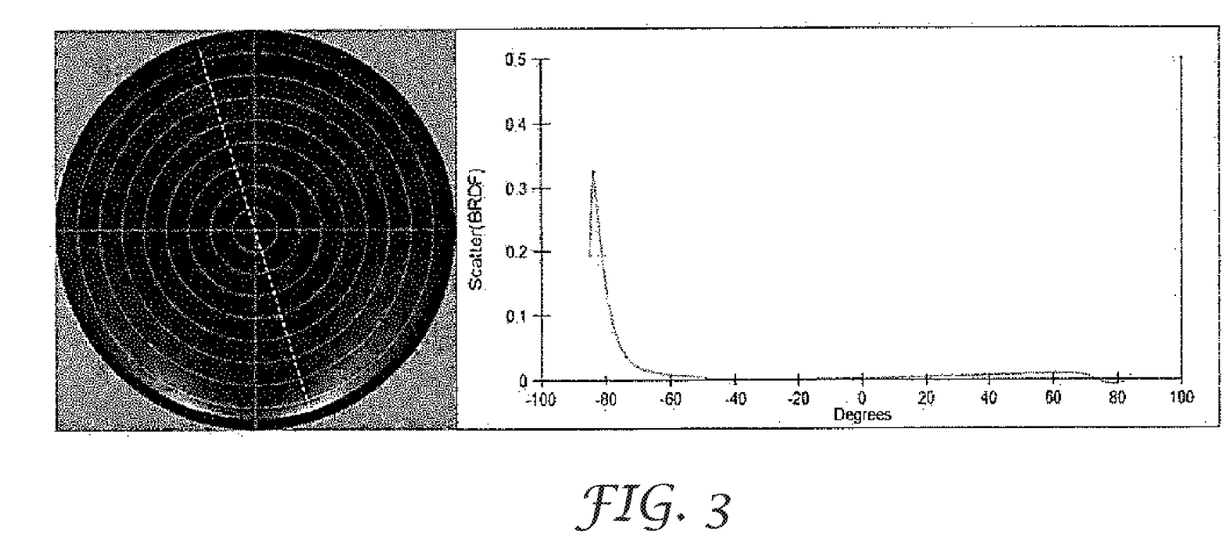
FIG. 3 shows the BRDF scatter map and cross-section plot for sample C.

FIG. 3 shows BRDF scatter map and cross-section plot for sample C, where the angle of incidence is 75° on the side with the nanostructure surface. Sample C has a peak BRDF scatter value just over 0.32 between 80° and 90°.

Figure 4:
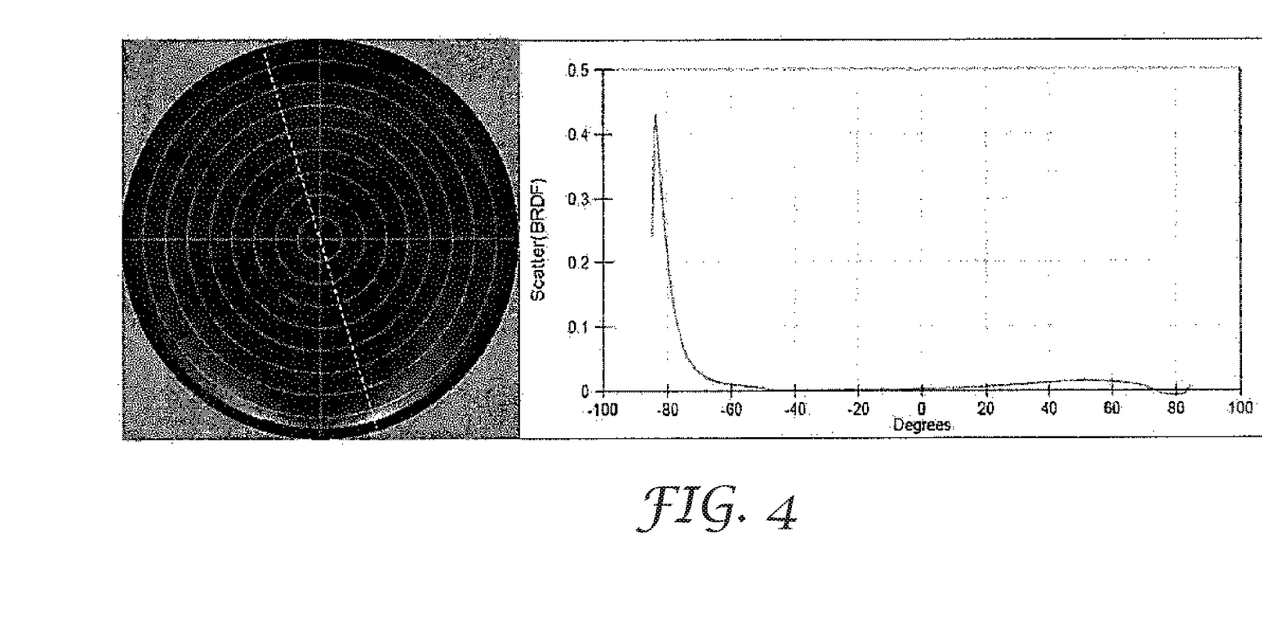
FIG. 4 shows the BRDF scatter map and cross-section plot for sample D.

FIG. 4 shows BRDF scatter map and cross-section plot for sample D, where the angle of incidence is 75° on the side with the nanostructure surface. Sample D has a peak BRDF scatter value just over 0.42 between 80° and 90°.

Figure 5:
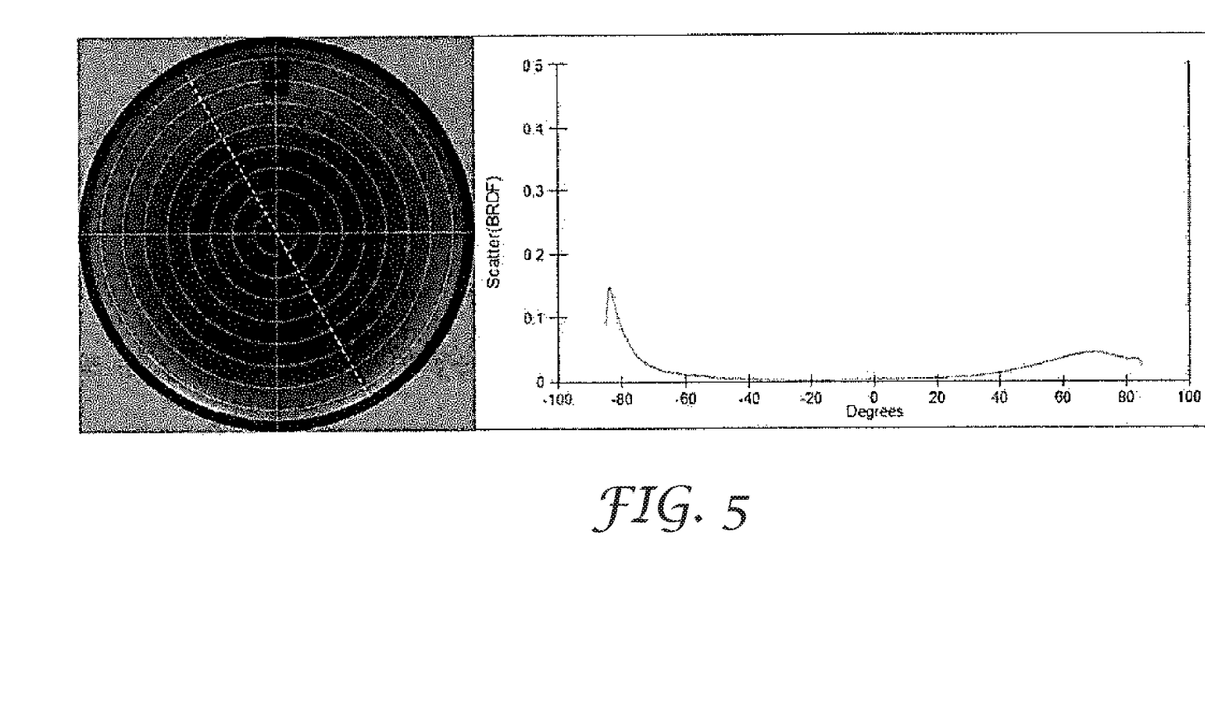
FIG. 5 shows the BRDF scatter map and cross-section plot for sample E.

FIG. 5 shows BRDF scatter map and cross-section plot for sample E, where the angle of incidence is 75° on the side with the nanostructure surface. Sample E has a peak BRDF scatter value just over 0.14 between 80° and 90°.

Example 2—Specular Gloss Test

The specular gloss of comparative samples A and B, and samples C, D, and E were measured using ASTM D523-14—Standard Test Method for Specular Gloss. The instrument used to collect 85 degree gloss readings was BYK Tri-Gloss Meter Cat No. 4520, available from BYK-Gardner, USA. The instrument guidelines described in the instrument brochure were followed to calibrate and operate the device to collect the measurements. ASTM D523-14 Standard Test Method guidelines were followed to collect at least 3 values for the examples. 85 degree gloss was chosen over 20 and 60 degree because the higher 85 degree is considered a practical angle to encompass the utility of samples C, D, and E. Table 4 describes the 85 degree gloss data for comparative samples A and B, and samples C, D, and E averaged across five measurements per sample. Measured gloss ratings by this test method are obtained by comparing the specular reflectance from the specimen to that from a black glass standard. In this instance, the black glass standard measured 99.8 gloss units.

TABLE 4

| Samples | 85 degree Gloss-ASTM D523-D14, Gloss Units | |
|---|---|---|
| | Average | Standard Deviation |
| Comparative Sample A | 98.88 | 0.798 |
| Comparative Sample B | 68.42 | 0.331 |
| Sample C | 1.44 | 0.049 |
| Sample D | 1.32 | 0.040 |
| Sample E | 0.54 | 0.049 |

Example 3—Ultraviolet-Visible-NIR Spectroscopy

The ultraviolet to near-infrared spectra was measured for each of the samples using a Lambda 1050 UV-Vis-NIR Spectrophotometer (Perkin Elmer Life Sciences, Downers Grove, IL, USA) with a PELA-1002 integrating sphere accessory with a slit width of 5 nm. The angle of incidence of the light source for this test was 8° relative to normal of the sample surface. Data was corrected with respect to a white PTFE reflectance standard. A single total reflectance spectra and a single diffuse reflectance spectra were obtained for each sample. The specular reflectance spectra was obtained for each sample by subtracting the diffuse reflectance spectra from the total reflectance spectra.

Figure 6:
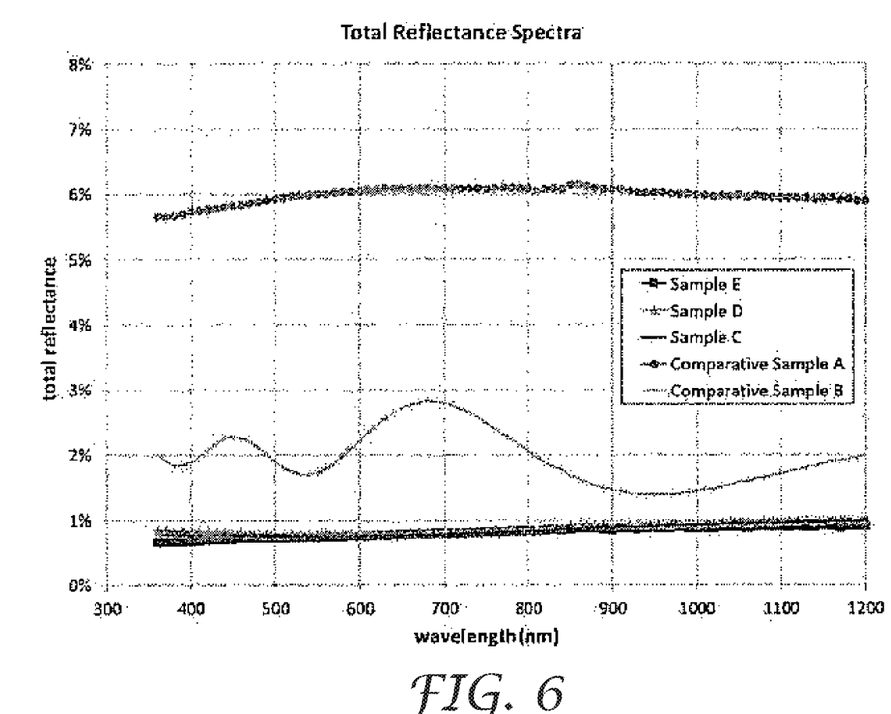
FIG. 6 shows the total reflectance at 8° incidence of comparative samples A and B and samples C, D, and E for wavelengths from 350 nm to 1200 nm.

FIG. 6 shows the total reflectance of comparative samples A and B and samples C, D, and E for wavelengths from 350 nm to 1200 nm.

Figure 7:
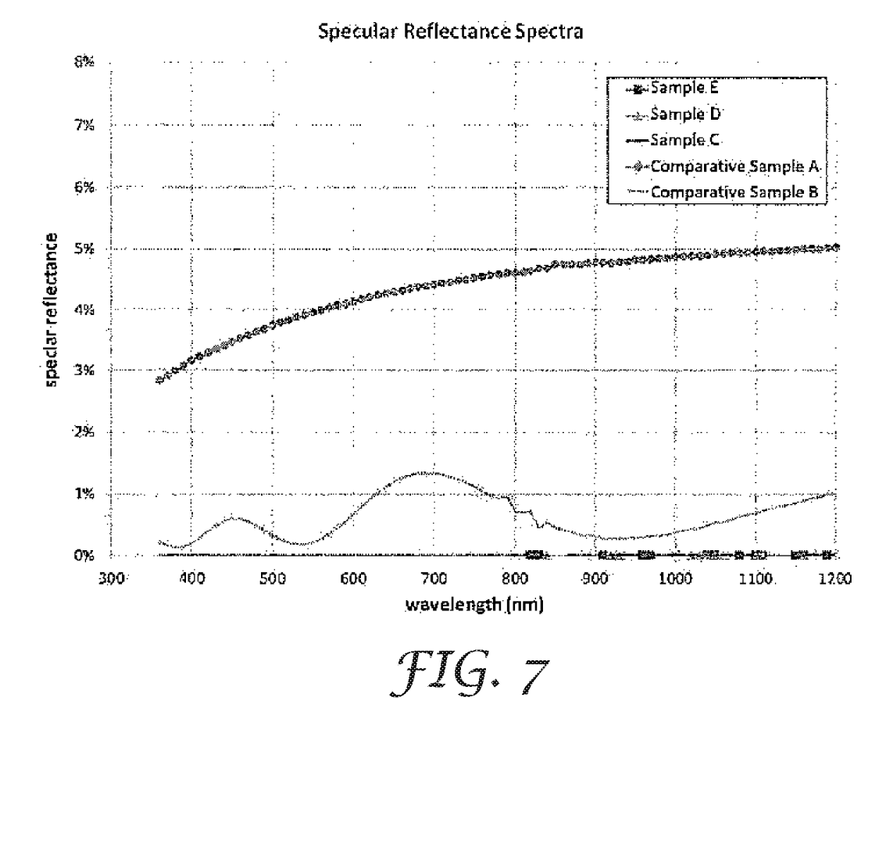
FIG. 7 shows the specular reflectance at 8° incidence of comparative samples A and B and samples C, D, and E for wavelengths from 350 nm to 1200 nm.

FIG. 7 shows the specular reflectance of comparative samples A and B and samples C, D, and E for wavelengths from 350 nm to 1200 nm.

The total reflectance spectra is at or below 1% for samples C, D, and E for wavelengths ranging from 350 to 1200 nm. The specular reflectance is indistinguishable from zero for samples C, D, and E. Comparative sample A has specular reflectance spectra with regions greater than 5%. Comparative sample B has specular reflectance spectra with regions greater than 1%.

What is claimed is:

1. A stray light absorbing film, comprising:
a substrate, wherein the substrate is black;
a first set of microstructures disposed on a major surface of the substrate and having a mean surface slope of between 35 and 55 degrees; and
a second set of microstructures disposed on the major surface of the substrate;
wherein the first set of microstructures are characterized by an average largest diameter between 0.5 and 125 µm;
wherein the second set of microstructures are characterized by an average largest diameter of less than ½ of the average largest diameter of the first set of microstructures; and
wherein the stray light absorbing film has a specular reflectance for 8° incidence for wavelengths from 350-1200 nm of less than 0.3%.

2. The stray light absorbing film of claim 1, the average largest diameter of the second set of microstructures is less than ⅕ the average largest diameter of the first set of microstructures.

3. The stray light absorbing film of claim 1, the average largest diameter of the second set of microstructures is less than ​1/10 the average largest diameter of the first set of microstructures.

4. The stray light absorbing film of claim 1, wherein the average largest diameter of the second set of microstructures is less than 100 nm.

5. The stray light absorbing film of claim 1, wherein each microstructure of the second set of microstructures is a hole that has a dimension of greatest extent along a length direction, and the average length direction is within 10 degrees of normal to a plane of the substrate.

6. The stray light absorbing film of claim 1, wherein each microstructure of the second set of microstructures is a hole that has a dimension of greatest extent along a length direction, and the average length direction is not within 10 degrees of normal to a plane of the substrate.

7. The stray light absorbing film of claim 1, wherein the substrate includes polyethylene terephthalate.

8. The stray light absorbing film of claim 1, wherein the substrate includes poly(methyl methacrylate).

9. The stray light absorbing film of claim 1, wherein the substrate includes polycarbonate.

10. The stray light absorbing film of claim 1, wherein the substrate includes carbon black.

11. The stray light absorbing film of claim 1, wherein the substrate further comprises a third set of microstructures disposed on a second major surface of the substrate, opposite the first major surface.

12. The stray light absorbing film as in claim 1, wherein the stray light absorbing film is curved.

13. The stray light absorbing film as in claim 1, wherein the stray light absorbing film is in thermal contact with a thermally conductive layer.

14. The stray light absorbing film as in claim 1, further comprising an adhesive layer.

15. An optical cavity, comprising the stray light absorbing film of claim 14.

16. A sensor module, including the stray light absorbing film as in claim 1.

17. An automobile, including the sensor module of claim 16.

18. A liquid crystal display device, including the stray light absorbing film as in claim 1.

19. A heads up display device, including the stray light absorbing film as in claim 1.

20. A stray light absorbing film, comprising:
a substrate, wherein the substrate is black;
a set of irregular, faceted microstructures disposed on a major surface of the substrate and having a mean surface slope of between 35 and 55 degrees; and
a set of nanostructures disposed on the set of irregular, faceted microstructures, wherein the nanostructures are holes within the set of irregular, faceted microstructures;

wherein none of the nanostructures is larger than the average largest diameter of the set of irregular, faceted microstructures; and wherein the stray light absorbing film has a specular reflectance for 8° incidence for wavelengths from 350-1200 nm of less than 0.3%.

21. The stray light absorbing film of claim 20, wherein each nanostructure hole has a dimension of greatest extent along a length direction, and the average length direction is within 10 degrees of normal to a plane of the substrate.

22. The stray light absorbing film of claim 20, wherein each nanostructure hole has a dimension of greatest extent along a length direction, and the average length direction is not within 10 degrees of normal to a plane of the substrate.

23. The stray light absorbing film of claim 20, wherein a total reflectance at 8° incidence from 350-1200 nm is less than 5%.

24. The stray light absorbing film of claim 23, wherein the total reflectance at 8° incidence from 350-1200 nm is less than 2%.

25. The stray light absorbing film of claim 23, wherein the total reflectance at 8° incidence from 350-1200 nm is less than 1%.

26. The stray light absorbing film of claim 20, wherein a CIE-Y photopic reflectance in an integrating sphere is less than 5%.

27. The stray light absorbing film of claim 26, wherein the CIE-Y photopic reflectance is less than 2%.

28. The stray light absorbing film of claim 20, wherein the stray light absorbing film has an 85 degree gloss of less than 5 gloss units.

29. The stray light absorbing film of claim 28, wherein the 85 degree gloss is less than 2 gloss units.

30. The stray light absorbing film of claim 20, wherein the stray light absorbing film has a bright reflectance with a BRDF cutoff of 0.01 of less than 4%.

31. The stray light absorbing film of claim 30, wherein the bright reflectance is less than 1%.

* * * * *